United States Patent [19]

Du-Rocher

[11] Patent Number: 5,762,506

[45] Date of Patent: Jun. 9, 1998

[54] CONNECTOR

[75] Inventor: Daniel J. Du-Rocher, Leonard, Mich.

[73] Assignee: Lucas Industries Public Limited Company, Solihull, England

[21] Appl. No.: 669,694

[22] Filed: Jun. 24, 1996

[30] Foreign Application Priority Data

Jun. 22, 1995 [GB] United Kingdom .................. 9512741

[51] Int. Cl.$^6$ ................................................ H01R 35/04
[52] U.S. Cl. ................................................ 439/164; 439/15
[58] Field of Search ............................. 439/164, 15

[56] References Cited

U.S. PATENT DOCUMENTS

| | | | |
|---|---|---|---|
| 5,171,153 | 12/1992 | Kubota et al. | 439/164 |
| 5,252,085 | 10/1993 | Kato et al. | 439/164 |
| 5,409,389 | 4/1995 | Masahiro et al. | 439/164 |
| 5,643,002 | 7/1997 | Wolf et al. | 439/15 |

Primary Examiner—Gary F. Paumen
Attorney, Agent, or Firm—Jacobson, Price, Holman & Stern, PLLC

[57] ABSTRACT

A rotary electrical connector comprising first and second relatively rotatable housing parts, a spacer provided between the housing parts and rotatable with respect thereto, an elongate conductor carried, at one end, by the first housing part and, at the other end, by the second housing part, the conductor defining a first coiled portion between the spacer and the first housing part and a second coiled portion between the spacer and the second housing part, the first and second coiled portions being wound in opposite directions, and a bearing locating the spacer for rotational movement within the housing defined by the first and second housing parts.

5 Claims, 3 Drawing Sheets

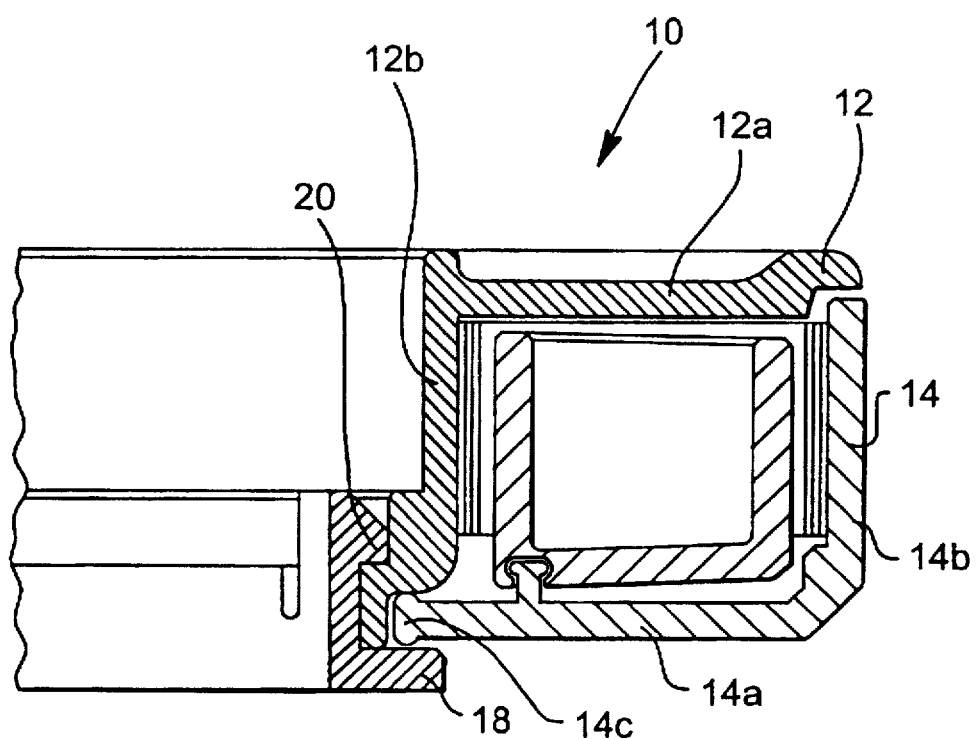

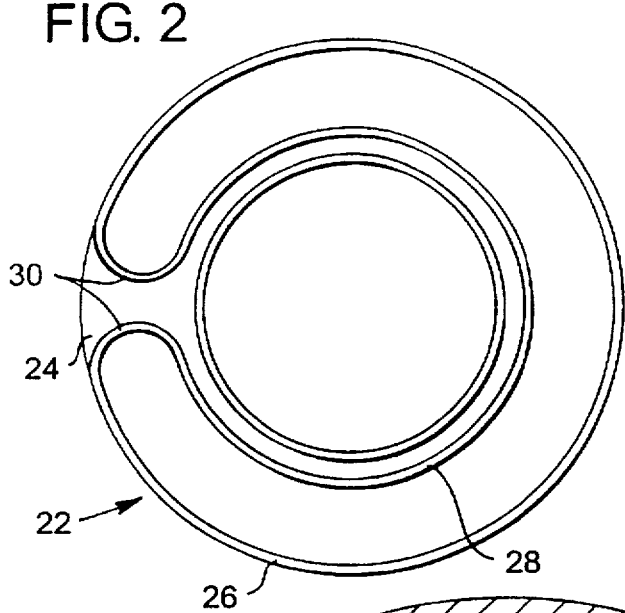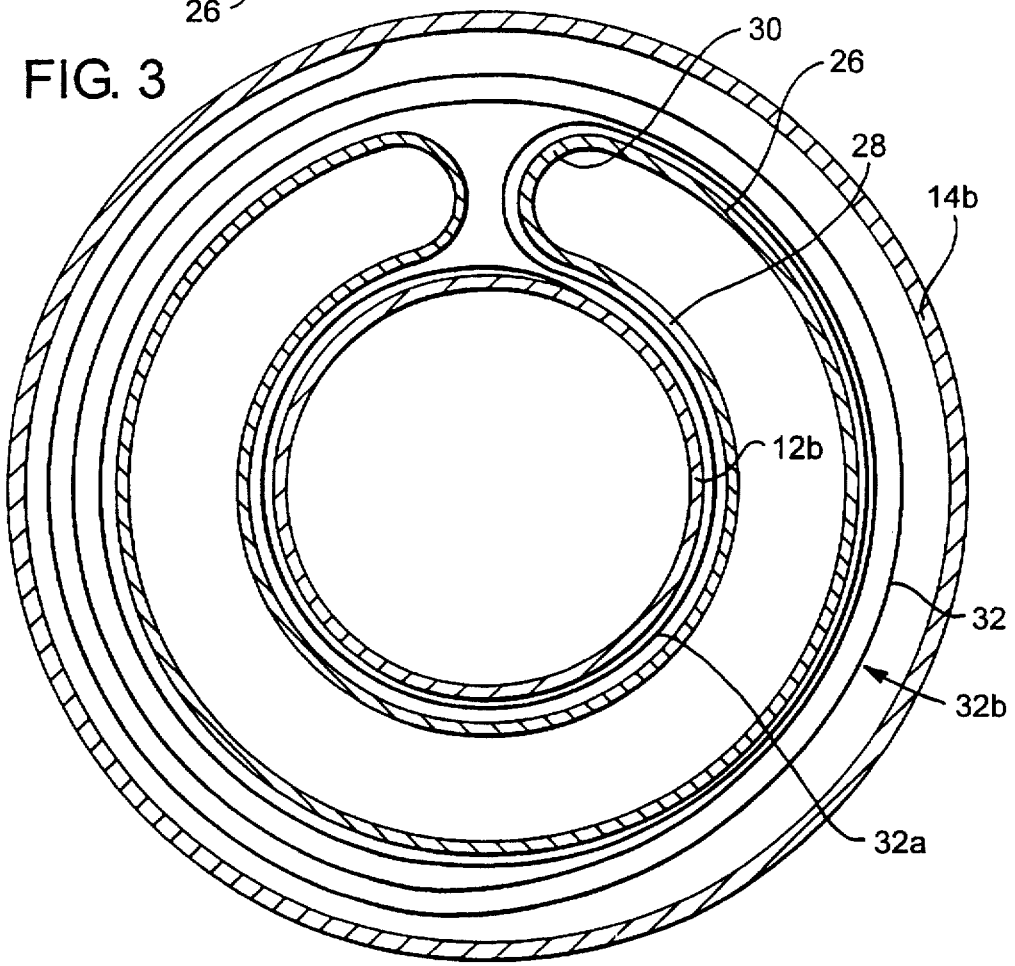

5,762,506

1

CONNECTOR

FIELD OF THE INVENTION

This invention relates to a connector, and in particular to a rotary electrical connector of the type known as a clock spring connector or ribbon connector.

BACKGROUND OF THE INVENTION

Conventional ribbon connectors comprise an annular housing defined by a rotor arranged to be connected to the steering column of a vehicle and a stator arranged to be connected to the vehicle's steering wheel, the rotor being rotatable with respect to the stator in use.

A loosely wound coil of generally flat, electrically conductive material is received within the annular housing, one end of the conductor being attached to the stator for connection to the vehicle's electrical system, the other end being connected to the rotor for connection to an air bag or other electrical device or switch carried by the steering wheel, and the conductor being wound tighter or unwound dependent on the direction of relative rotation of the parts.

In connectors of this type, approximately 5 meters of conductive material is used, and it is advantageous to reduce this length in order to reduce the cost of the connector.

One way of reducing the length of conductive material is to use an arrangement as described in U.S. Pat. No. 5,252,085. In the arrangement disclosed in U.S. Pat. No. 5,252,085, a generally C-shaped spacer is provided within the connector so as to be rotatable with respect to both the first and second parts, a plurality of turns of the conductor being provided between the spacer and the rotor, the conductor passing between the ends of the C-shaped spacer, and a plurality of turns being provided between the spacer and the stator, the two sets of turns being wound in opposite directions. Relative movement of the rotor and stator results in a relatively small movement of the spacer, and in a relatively small length of conductor being unwound from one of the sets of turns and wound onto the other of the sets, a smaller length of conductor being required to permit the same range of rotational movement as is permitted in the first described connector.

Connectors of the spacer type illustrated in U.S. Pat. No. 5,252,085 suffer from the disadvantage of being noisy in use. Sufficient clearance is needed between the components to ensure freedom of movement but this in turn leads to rattling and scraping sounds as the spacer and the conductor move between the rotor and stator, and possible wearing of the components. It is an object of the present invention to provide a connector in which such problems are minimised.

SUMMARY OF THE INVENTION

According to the present invention there is provided a connector comprising first and second relatively rotatable housing parts, a spacer provided between the housing parts and rotatable with respect thereto, an elongate conductor carried, at one end, by the first housing part and, at the other end, by the second housing part, the conductor defining a first coiled portion between the spacer and the first housing part, and a second coiled portion between the spacer and the second housing part, the first and second coiled portions being wound in opposite directions, and bearing means locating the spacer for rotational movement within the housing defined by the first and second housing parts.

Preferably, the bearing means comprises a flange provided on one of the housing and the spacer, the flange cooperating with a recess provided on the other of the housing and the spacer.

The flange is conveniently a radially inwardly extending flange provided on the spacer, the recess conveniently being defined between the first and second housing parts.

Where the bearing means is of this form, it will be understood that in order to permit the spacer to rotate within the housing, a degree of freedom of radial and axial movement of the spacer within the housing will be permitted, as without such freedom, rotational movement of the spacer would be inhibited. However, the bearing means restricts the amount of radial and axial movement, thus reducing the level of rattling. The bearing means preferably further supports the spacer such that scraping of the spacer against the first and/or second housing parts is reduced.

BRIEF DESCRIPTION OF THE DRAWINGS

The invention will further be described, by way of example, with reference to the accompanying drawings, in which:

FIG. 1A is an alternative arrangement of FIG. 1;

FIG. 2 is a plan view of the spacer of the embodiment of FIG. 1; and

FIG. 3 is a cross-sectional view of the embodiment of FIG. 1.

DETAILED DESCRIPTION OF THE PREFERRED EMBODIMENTS

Figure 1:
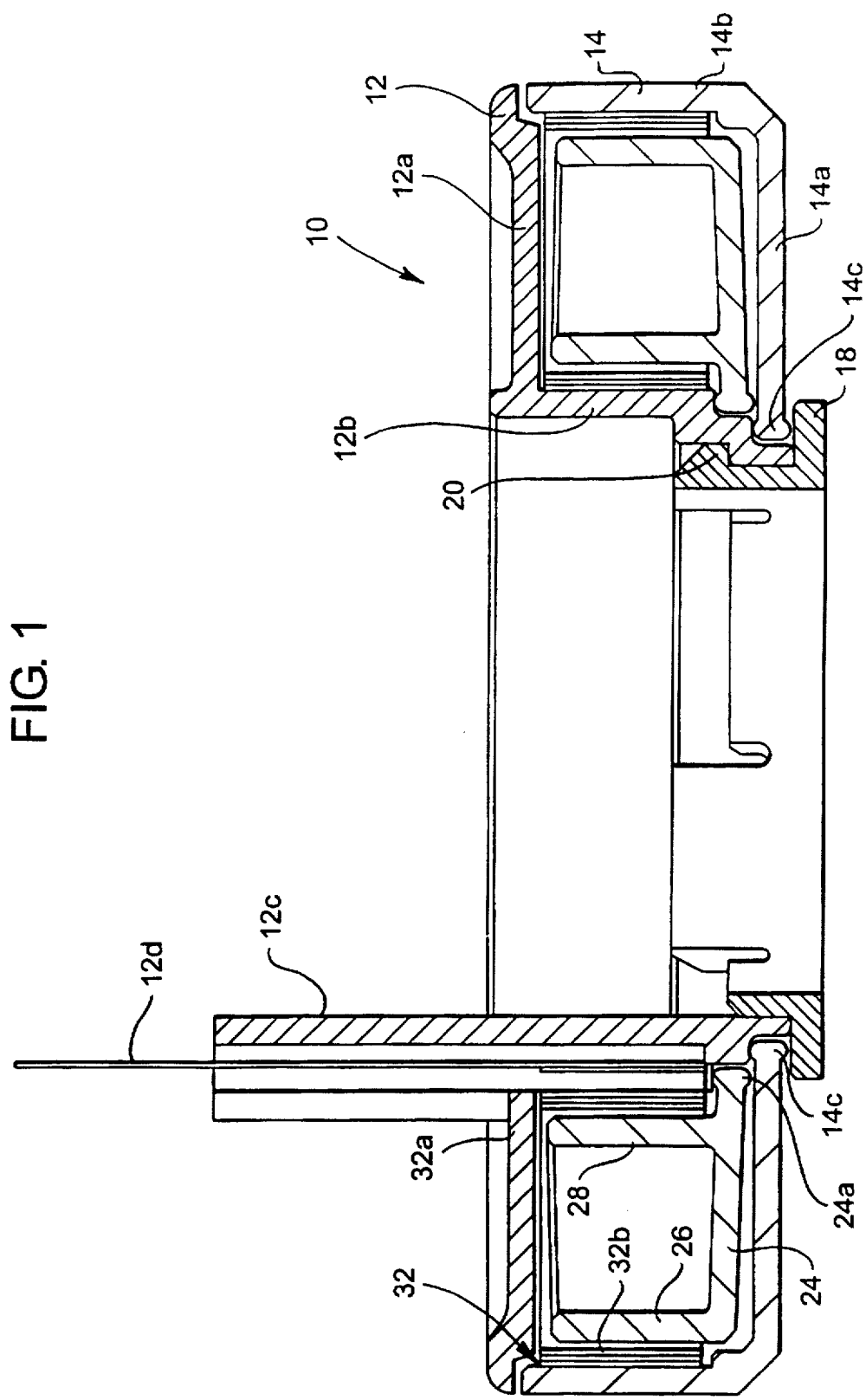
FIG. 1 is a cross-sectional view of a connector in accordance with an embodiment of the invention.

The connector illustrated in the accompanying drawings comprises a housing 10 defined by a rotor 12 and a stator 14, the rotor 12 comprising a plastics moulding having an upper annular flange 12a and a downwardly depending stepped hub 12b. The stator 14 comprises an upstanding cylindrical wall 14b, the lower edge of which is provided with an inwardly extending annular flange 14a. The rotor 12 and stator 14 are shaped to cooperate with one another so as to define an annular chamber, the rotor 12 being rotatable with respect to the stator 14.

As shown in FIG. 1, the inner end of the flange 14a of the stator 14 includes an enlarged peripheral bead 14c which seats in a step provided on the outer surface of the hub 12b to define part of a bearing permitting relative rotational movement of the rotor and stator.

An annular locking member 16 is received within the hub 12b the member 16 being generally cylindrical having an outer diameter slightly smaller than the inner diameter of the hub 12b, the lower part of the locking member 16 being provided with an outwardly extending flange 18. The locking member 16 has teeth 20 which are arranged to engage as a snap-fit in suitable recesses or an annular recess provided in the hub 12b. The outwardly extending flange 18 is arranged to define together with the hub 12b a recess within which the bead 14c of the flange 14a is received, the attachment of the locking member 16 to the rotor 12 securing the rotor and stator to one another whilst permitting relative rotation thereof.

Within the annular chamber defined by the rotor and the stator there is provided a spacer 22 (FIG. 2) comprising an annular base 24 the outer peripheral edge of which is provided with an upstanding wall 26. The wall 26 extends almost all of the way around the periphery of the base 24 and a similar upstanding wall 28 extends around the base 24 at a position spaced slightly from the inner circumference of the base 24. The opening in the wall 28 is aligned with the opening of the wall 26 and as shown in FIG. 2, each end of the wall 26 is interconnected with a respective end of the wall 28 by a curved end wall 30, the end walls 30 being spaced apart from one another.

The inner circumferential edge of the base 24 includes an integral enlarged bead 24a engaged in a recess defined by the hub 12b of the rotor and an inner part of the flange 14a of the stator 14. The axial dimension of the recess is slightly larger than the axial dimension of the bead 24a and the circumference of the part of the hub 12b defining the base of the recess is slightly smaller than the inner diameter of the base 24. It will be recognised therefore that the bead region 24a of the flange 24 received in the recess defined between the flange 14a and the step on the hub 12b provides a bearing arrangement whereby the spacer 22 is guided in its rotation with respect to both the rotor and the stator within the annular chamber defined thereby.

FIG. 1A shows the reverse arrangement where the enlarged bead is on the housing and the recess in on the spacer.

The rotor 12 and stator 14 are each provided with electrical connectors in the form of sockets for connection to suitable electrical plugs. The socket of the rotor 12 is illustrated in FIG. 1 and comprises an upwardly extending integral part 12c defining a recess within which a suitable electrical plug is receivable, a terminal blade or pin 12d extending within the recess for electrical connection to a respective terminal of the plug connector.

A ribbon connector 32 in the form of a flat cable comprising a plastics material base having at least one conductive strip laminated therein, is received within the housing 10, one of the conductors being connected to the pin 12d, and the other end of the conductor being connected to a similar pin provided in the socket connector associated with the stator 14. The other conductor of the flat cable are similarly connected to respective terminals in connectors of the rotor and the stator.

The ribbon connector 32 is wound so as to define a first coiled portion 32a housed between the upstanding wall 28 of the spacer 22 and the hub 12b of the first housing portion 12. The outermost end of the first coiled portion 32a extends between the end walls 30 of the spacer 22 and the remaining part of the ribbon connector 32 is coiled to define a second coiled portion 32b extending between the upstanding wall 26 of the spacer 22 and the upstanding wall 14b of the second housing part 14. The first and second coiled portions 32a, 32b are wound in opposite directions as illustrated in FIG. 3.

It will be understood from FIG. 3 that if the rotor 12 is rotated in a clockwise direction with respect to the stator 14, the spacer 22 will also rotate in a clockwise direction, the spacer 22 moving by approximately one half of the amount of movement of the distance through which the rotor is moved. The spacer 22 is moved clockwise by winding the conductor 32 onto the hub 12b, the outer part of the first coiled region 32a of the conductor 32 correspondingly unwinding and passing through the opening defined by the end walls 30 of the spacer 22. It will be recognised that rotation of the rotor 12 in a counterclockwise direction unwinds the conductor 32 from the hub 12b passing it through the opening of the spacer 22 to wind within the stator wall 14b rotating the spacer 22 in a counterclockwise direction through half the distance through which the rotor is moved. The bearing arrangement of the inner portion of the base 24 of the spacer 22 within the recess defined by the rotor and stator, limits axial and transverse movement of the spacer 22 with respect to the housing 10 thus reducing the risk of rattling in use. It will further be realised from FIG. 1 that the base member 24 is of slightly dished form thus, in conjunction with the bearing arrangement, spacing the majority of the base member 24 from the flange 14a of the stator 14 thereby effecting a reduction in the level of scraping which occurs between the spacer 22 and the rotor 12 and stator 14, and thus in a reduction in the level of noise generated.

I claim:

1. A rotary electrical connector comprising first and second relatively rotatable housing parts, a spacer provided between the housing parts and freely rotatable with respect thereto, an elongate conductor carried, at one end, by the first housing part and, at the other end, by the second housing part, the conductor defining a first coiled portion between the spacer and the first housing part and a second coiled portion between the spacer and the second housing part, the first and second coiled portions being wound in opposite directions, and a bearing arrangement locating the spacer for rotational movement within the housing defined by the first and second housing parts, said bearing arrangement comprising a flange provided on one of the housing and the spacer, the flange cooperating with a recess provided on the other of the housing and the spacer, and a portion of the conductor located between the first coiled portion and the second coiled portion extending through a gap in the spacer so as to cooperate with the spacer to move the spacer rotationally during winding and unwinding of the coiled portions as the first and second housing parts are rotated relative to one another.

2. A connector as claimed in claim 1, wherein said flange is a radially inwardly extending flange provided on the spacer, the recess being defined between the first and second housing parts.

3. A connector as claimed in claim 1, wherein said bearing arrangement locates said spacer substantially out of contact with the housing to minimize scraping in use.

4. A connector as claimed in claim 1, wherein said flange terminates in a beaded edge received in said recess.

5. A connector as claimed in claim 2, wherein said flange terminates in a beaded edge received in said recess.

* * * * *